(12) United States Patent
Jayaraman et al.

(10) Patent No.: US 9,710,775 B2
(45) Date of Patent: Jul. 18, 2017

(54) SYSTEM AND METHOD FOR OPTIMIZING RISK DURING A SOFTWARE RELEASE

(71) Applicant: Wipro Limited, Bangalore (IN)

(72) Inventors: Venkata Subramanian Jayaraman, Chennai (IN); Sumithra Sundaresan, Chennai (IN)

(73) Assignee: Wipro Limited, Bangalore (IN)

( * ) Notice: Subject to any disclaimer, the term of this patent is extended or adjusted under 35 U.S.C. 154(b) by 7 days.

(21) Appl. No.: 14/742,950

(22) Filed: Jun. 18, 2015

(65) Prior Publication Data
US 2016/0314417 A1    Oct. 27, 2016

(30) Foreign Application Priority Data

Apr. 22, 2015 (IN) ............................ 2074/CHE/2015

(51) Int. Cl.
*G06F 9/44* (2006.01)
*G06Q 10/06* (2012.01)

(52) U.S. Cl.
CPC ............................. *G06Q 10/0635* (2013.01)

(58) Field of Classification Search
CPC ....................... G06Q 10/0635; G06Q 10/0637
USPC .................................................. 717/101–103
See application file for complete search history.

(56) References Cited

U.S. PATENT DOCUMENTS

| | | | | |
|---|---|---|---|---|
| 6,219,805 B1 * | 4/2001 | Jones | ................... | G06F 11/3616 714/25 |
| 7,146,608 B1 * | 12/2006 | Newman | ................... | G06F 8/71 714/E11.207 |
| 7,359,865 B1 * | 4/2008 | Connor | ................... | G06Q 40/08 705/7.28 |
| 8,006,222 B2 * | 8/2011 | Ruhe | ...................... | G06Q 10/10 705/12 |
| 8,843,878 B1 * | 9/2014 | Grundner | ........... | G06Q 10/0631 717/101 |

OTHER PUBLICATIONS

Hans Sassenburg, "Design of a Methodology to Support Software Release Decisions: Do the Numbers Really Matter?", 2005, published by SE-CURE AG, Switzerland, pp. vii-xvi, 1-263.*
Trendowicz et al., "Factors Influencing Software Development Productivity—State of the Art and Industrial Experiences", Dec. 2009, in in Advances in Computers, retrieved from https://www.researchgate.net/publication/220662922, pp. 1-49.*

* cited by examiner

*Primary Examiner* — Ted T Vo
(74) *Attorney, Agent, or Firm* — LeClairRyan, a Professional Corporation

(57) ABSTRACT

This disclosure relates generally to software release management, and more particularly to a system and method for optimizing risk during a software release. In one embodiment, a method is provided for determining a risk associated with a release of a software product. The method comprises gathering a plurality of parameters related to the software product, determining a plurality of complexity levels based on the plurality of parameters, determining a stability of the software product based on a stability of a baseline software product, determining an overall complexity level of the release of the software product based on the plurality of complexity levels and the stability of the software product, and determining the risk associated with the release of the software product based on the overall complexity level.

18 Claims, 4 Drawing Sheets

SYSTEM AND METHOD FOR OPTIMIZING RISK DURING A SOFTWARE RELEASE

This application claims the benefit of Indian Patent Application Serial No. 2074/CHE/2015 filed Apr. 22, 2015, which is hereby incorporated by reference in its entirety.

TECHNICAL FIELD

This disclosure relates generally to software release management, and more particularly to a system and method for optimizing risk during a software release.

BACKGROUND

In the current business environment, effective management of software product development and its release are critical to the success of Information Technology (IT) organizations. Various project management techniques have been developed in an effort to manage software product development and its subsequent release. Although these project management techniques enable timely completion of the software product developments, product managers continue to find it difficult to predict risk involved for upcoming software releases. Reliable prediction of the risks associated with software product releases may enable product managers to take necessary steps to minimize the same before releases.

Currently, during software production release, effective prioritization of the business requirements and base stability of the product is not measured so as to mitigate the risks and failures. Hence, business requirements and new components enter into the production without any impact analysis and risk mitigation, thereby leading to critical defects uncovered in the production. It is preferable to identify and correct defects as soon as possible in a software product development.

The risk analysis and prioritization is done manually by a business user and is therefore error-prone. There is no systematic way for identifying the risk in base system and prioritization of project requirements in the release, which leads to lack of confidence within different business stakeholders. For example, the monitoring done by the support team are usually increased during the release of patches which in turn not only increases the business spend for a particular release but also adversely impacts the customer experience.

The above discussed issues may lead to slippage of critical defects to production cycles that may sometimes result in rollback of a release. For example, the release may be delayed or rolled back because of defective code and enormous support requirement. Eventually, an organization's reputation and competitiveness may be impacted as time to market for software product release is interrupted. In short, existing software production release risk determination techniques do not completely address the issues stated above.

SUMMARY

In one embodiment, a method for determining a risk associated with a release of a software product is disclosed. In one example, the method comprises gathering a plurality of parameters related to the software product. The method further comprises determining a plurality of complexity levels based on the plurality of parameters. The method further comprises determining a stability of the software product based on a stability of a baseline software product. The method further comprises determining an overall complexity level of the release of the software product based on the plurality of complexity levels and the stability of the software product. The method further comprises determining the risk associated with the release of the software product based on the overall complexity level.

In one embodiment, a system for determining a risk associated with a release of a software product is disclosed. In one example, the system comprises at least one processor and a memory communicatively coupled to the at least one processor. The memory stores processor-executable instructions, which, on execution, cause the processor to gather a plurality of parameters related to the software product. The processor-executable instructions, on execution, further cause the processor to determine a plurality of complexity levels based on the plurality of parameters. The processor-executable instructions, on execution, further cause the processor to determine a stability of the software product based on a stability of a baseline software product. The processor-executable instructions, on execution, further cause the processor to determine an overall complexity level of the release of the software product based on the plurality of complexity levels and the stability of the software product. The processor-executable instructions, on execution, further cause the processor to determine the risk associated with the release of the software product based on the overall complexity level.

In one embodiment, a non-transitory computer-readable medium storing computer-executable instructions for determining a risk associated with a release of a software product is disclosed. In one example, the stored instructions, when executed by a processor, cause the processor to perform operations comprising gathering a plurality of parameters related to the software product. The operations further comprise determining a plurality of complexity levels based on the plurality of parameters. The operations further comprise determining a stability of the software product based on a stability of a baseline software product. The operations further comprise determining an overall complexity level of the release of the software product based on the plurality of complexity levels and the stability of the software product. The operations further comprise determining the risk associated with the release of the software product based on the overall complexity level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
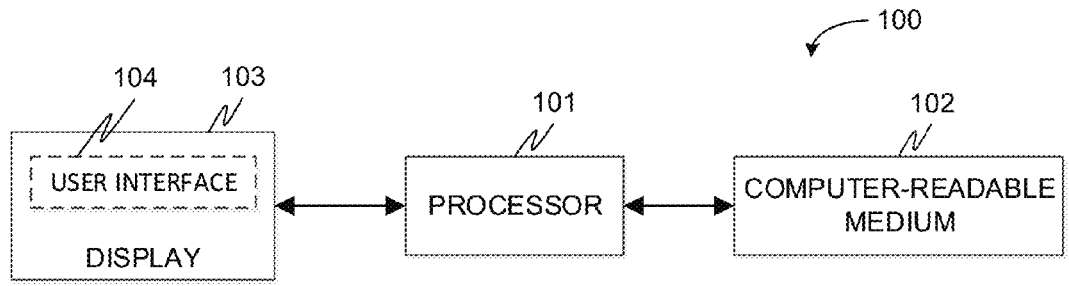
FIG. 1 is a block diagram of an exemplary system for optimizing risks during software product release in accordance with some embodiments of the present disclosure.

Referring now to FIG. 1, an exemplary system 100 for optimizing risks during software product release is illustrated in accordance with some embodiments of the present disclosure. In particular, the system 100 implements a complexity quantifier and risk optimization engine for determining complexities and risk associated with release of a software product. The complexity quantifier and risk optimization engine interacts with multiple users and software product development and management platforms, determines the complexities and risk associated with release of the software product, and presents the risk to key stakeholders. The system 100 comprises one or more processors 101, a computer-readable medium (e.g., a memory) 102, and a display 103. The computer-readable medium 102 stores instructions that, when executed by the one or more processors 101, cause the one or more processors 101 to perform optimization of risks during software product release in accordance with aspects of the present disclosure. The system 100 interacts with users via a user interface 104 accessible to the users via the display 103.

Figure 2:
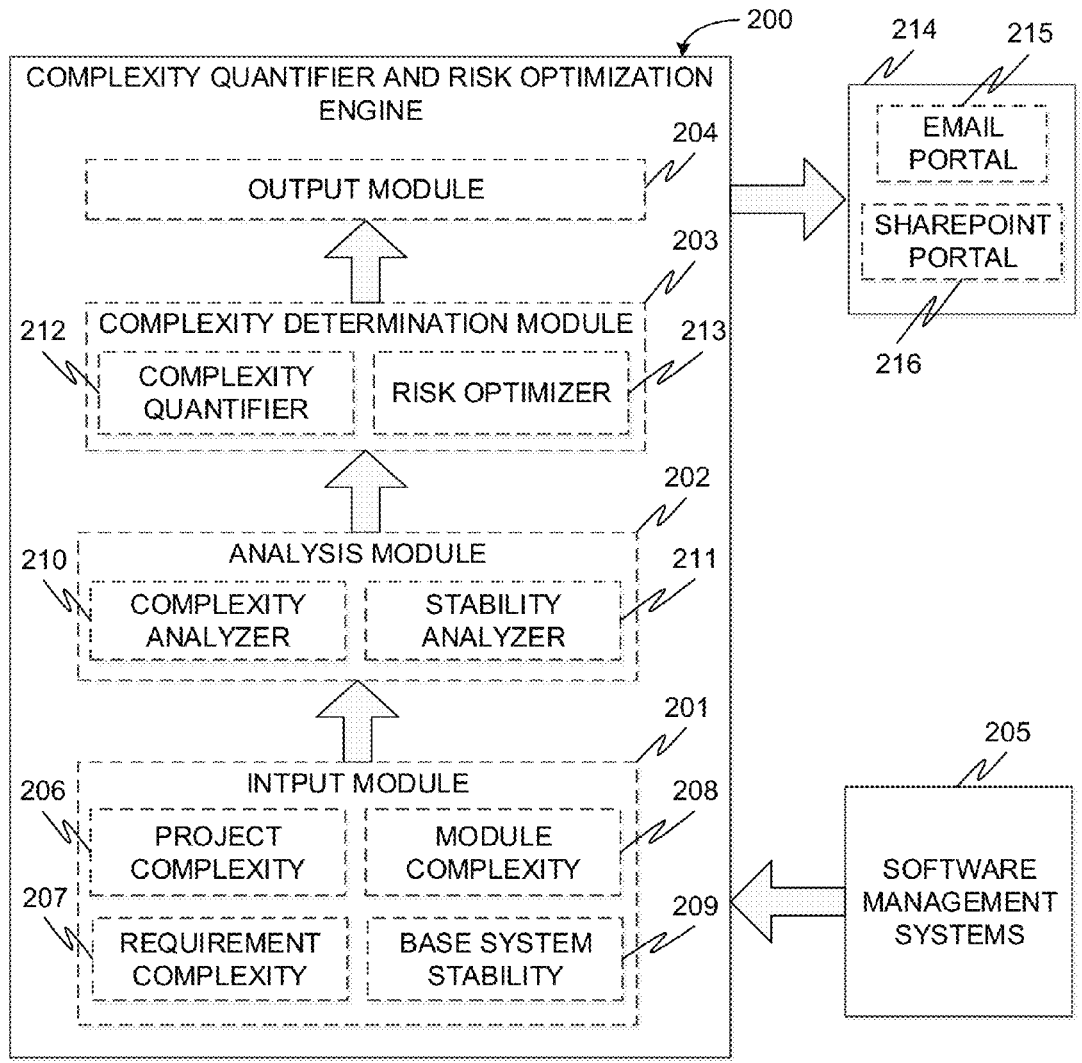
FIG. 2 is a functional block diagram of complexity quantifier and risk optimization engine in accordance with some embodiments of the present disclosure.

Referring now to FIG. 2, a functional block diagram of a complexity quantifier and risk optimization engine 200 implemented by the system 100 of FIG. 1 is illustrated in accordance with some embodiments of the present disclosure. As will be described in greater detail below, the complexity quantifier and risk optimization engine 200 identifies different system parameters and complexities associated with them, determines the stability of the system using the baseline stability, determines the overall complexity of the release, determines the risk associated with release, and presents the risk information to the stake holders. In some embodiments, the complexity quantifier and risk optimization engine 200 comprises an input module 201, an analysis module 202, a complexity determination module 203, and an output module 204.

The input module 201 receives all the parameters required for determining the risk at project level and therefore at product level. As will be appreciated by those skilled in the art, a typical software product may include one or more projects and each of the projects may further be organized into one or more modules or components. The inputs module 201 receives input from a software management system 205 or a user via the user interface. In some embodiments, the software management system 205 may be an application lifecycle management (ALM) platform such as IBM™ Rational® Jazz™ platform, Microsoft™ Team Foundation Server (TFS), HP® ALM, and so forth. Alternatively, the software management system 205 may be any test management tool or any requirement management tool that may be employed for development of the software product.

The input module 201 may further include one or more sub-modules to receive information on project requirements details, defect parameters, and so forth. In some embodiments, the input module 201 may include a project complexity sub-module 206, a requirement complexity sub-module 207, a module complexity sub-module 208, and a base system stability sub-module 209. The project complexity sub-module 206 receives the complexity of each projects related to the software product and the impacted sub-systems. The requirement complexity sub-module 207 receives as inputs the requirements and the complexity of the requirements for each project. For example, the requirements may be obtained from HP® ALM or any requirements management tool. Further, at least one of a business team, a quality assurance (QA) team, and an application development team may review each requirement and may provide corresponding complexity data. The module complexity sub-module 208 receives as inputs the modules and the complexity of the modules for each project. The application development team may determine the complexity of each module and provide the data to this sub-module. The base system stability sub-module 209 receives as inputs base system that is already in production and the stability of the base system based on defects per system area. This data may be provided by the release management team based on the roll out plan and the total modules that were rolled out every release.

The analysis module 202 gathers data from each sub-modules of the input module 201 and performs a descriptive analysis for determining the complexity and the stability for each project. In some embodiments, the analysis module 202 may include a complexity analyzer sub-module 210 and a stability analyzer sub-module 211. The complexity analyzer sub-module 210 employs the parameters from the input modules project complexity sub-module 206, requirement complexity sub-module 207, and module complexity sub-module 208. In some embodiments, the complexity analyzer sub-module 210 may have unique values for simple, medium, and complex complexity level under which the complexity may be categorized. As will be appreciated, the complexity analyzer sub-module 210 may have default values for each complexity level which may be updated by a user. For example, in certain embodiments, a sample illustration of the default weightages for the complexity level is provided in following table:

TABLE A

| Complexity Level | Value |
|---|---|
| Simple | $X <= 1$ |
| Medium | $1 < X <= 2.5$ |
| Complex | $X > 2.5$ |

In above table, 'X' denotes the complexity level and the values '2.5' and '1' are configurable values based on business requirements.

The stability analyzer sub-module 211 determines stability of a project in a release based on stability of the project in baseline software product i.e., baseline stability. In particular, stability analyzer sub-module 211 determines stability of the project in the current release based on the logic of the previous release to the current release and the complexity of the current release requirements. For example, in some embodiments, the stability of the project in the current release is determined by determining the involvement of the particular project in the previous releases, its stability in previous releases, and the complexity of the current release requirements. The logic may be to determine the stability of the project based on its stability in previous releases provided that the same project was involved in previous releases. In other words, if the project was already fully tested in the previous release and can be tested fully in the current release then it will not introduce any risk as it is stable. Based on the data available the stability analyzer sub-module 211 identifies the stability a project and the stability of the release. As will be appreciated, the stability analyzer sub-module 211 may have default values for each stability measure which may be updated by a user. For example, in certain embodiments, a sample illustration of the default weightages for the stability measure is provided in following table:

TABLE B

| Stability Measure | Value |
|---|---|
| Simple | S <= 1 |
| Medium | 1 < S <= 3 |
| Complex | S > 3 |

In above table, 'S' denotes the stability measure and the values '3' and '1' are configurable parameters based on business requirements.

The complexity determination module 203 employs the inputs from analysis module 202 to determine the overall complexity and to optimize the risk. In some embodiments, the complexity determination module 203 may include a complexity quantifier sub-module 212 and a risk optimizer sub-module 213. The complexity quantifier sub-module 212 analyzes the data received from the complexity analyzer sub-module 210 and the stability analyzer sub-module 211 and provides a method to conclude the overall complexity of the release as will be described in greater detail herein below. As will be appreciated, the complexity quantifier sub-module 212 may have default values for the overall complexity of the release which may be updated by a user. For example, in certain embodiments, a sample illustration of the default weightages for the overall complexity of the release is provided in following table:

TABLE C

| Complexity Factor | Value |
|---|---|
| Simple | 0 <= CF <= 4 |
| Medium | 4 < CF <= 9 |
| Complex | S > 9 |

In above table, 'CF' denotes the overall release complexity factor and the values '4' and '9' are configurable parameters based on business requirements.

The risks optimizer sub-module 213 identifies the risks involved in the projects based on the data derived from complexity quantifier sub-module 212. The highest risk is provided to the most complex project defined by all the parameters. For example, if the complexity of requirements and the complexity of modules are high and the base line stability is bad then that particular project is considered to have the highest risk. As will be appreciated, the risks optimizer sub-module 213 may have default values for the overall risk of the release which may be updated by a user. For example, in certain embodiments, a sample illustration of the default weightages for the overall risk of the release is provided in following table:

TABLE D

| Risk Optimized Level | Value |
|---|---|
| Simple | 0 <= R <= 1 |
| Medium | 1 < R <= 3 |
| Complex | R > 3 |

In above table, 'R' denotes the overall release risk and the values '1' and '3' are configurable parameters based on business requirements.

The output module 204 provides output to key stake holders such as the product manager. The various risk level for each projects in the release are either shared with key stakeholders over a collaborative platform such as MS Share Point or triggered as an email to the key stakeholders. The output module 204 triggers email to the key stakeholder via an email portal 215 once the project risk score is identified. Alternatively, the output module 204 provides a centralized portal 216 to various stakeholders to view the risks across projects entering into a release.

In some embodiments, a user may launch the complexity quantifier and risk optimization engine 200 from the web browser or other interfaces. Upon launch, the different system parameters are identified along with complexities associated with each of the parameters. The input module 201 receives the details about the different system parameters required for determining the risk at project level from one or more third party systems such as a test management system, a requirements system, a software lifecycle management system, and so forth or from one or more users. The total number of projects, the modules of each project entering into the release, the requirements, and other such parameters are identified. The complexities associated with projects, modules, and requirements are inputted by the different users such as the business team, QA team and the software application development team through the input module.

The input is then provided to the analysis module 202 which determines requirement complexity, module complexity, testing complexity, project complexity, and stability of the system. The complexity analyzer sub-module 210 receives the input from the requirements complexity sub-module 207 which consists of the complexity value for each of the requirements provided by different users such as the business team, QA team and the application development team. The overall complexity assessment is based on the average derivative of the requirement complexity provided by different teams. The overall requirement complexity is determined and classified based on the 'Table A' where 'X' is equal to the ratio of the total requirements to assessment. A sample illustration for determining requirement complexity is provided below:

| Requirement ID | Name | Description | Business Team | QA Team | Development Team | Average |
|---|---|---|---|---|---|---|
| 1 | Sample 1 | Sample 1 | 3 | 1 | 2 | 2 |
| 2 | Sample 2 | Sample 2 | 3 | 1 | 1 | 1.67 |
| 3 | Sample 3 | Sample 3 | 2 | 3 | 3 | 1.67 |

| Overall Risk Assessment | |
| --- | --- |
| Total Requirements | 20 |
| Assessment | 3.02 |
| Requirement Complexity | Complex |

Further, the complexity analyzer sub-module 210 receives the input from the module complexity sub-module 208 which consists of the inputs from the product development team on the details of modules within a project and risk and impact of each module. The module complexity is determined based on the data sheet available from the product development team. Further, the QA team provides the inputs of the total test cases that are available in the module to give the determination of the complexity from QA end as well. A sample illustration of the data sheet is provided below:

| Functional Area | Total Test Cases | Complexity | Risk | Total Areas Impacted |
| --- | --- | --- | --- | --- |
| FA1 | 13 | 1 | 3 | Overall |
| FA2 | 4 | 1 | 3 | 2 |
| FA3 | 22 | 3 | 2 | 2 |
| FA4 | 9 | 1 | 3 | Overall |

Testing complexity is defined based on the how much the project was tested. A sample illustration for determining test complexity is provided below:

| Test Coverage | Weightage |
| --- | --- |
| Full Testing Done | Simple |
| Partial Testing Done | Medium |
| No Testing Done | Complex |

Moreover, the complexity analyzer sub-module 210 receives the input from the project complexity sub-module 206 which consists of the complexity value for various subsystems/modules that may be impacted because of the new changes. The overall complexity assessment is based on the total complex requirements that are available and modules that are impacted. The overall project complexity is determined based on the requirement complexity, testing complexity, and module complexity determined above. A sample illustration for determining project complexity is provided below:

| Project | Requirement Complexity | Testing Complexity | Module Complexity |
| --- | --- | --- | --- |
| PRJ1 | 2 | 1 | 2 |
| PRJ2 | 1 | 2 | 2 |

The stability analyzer sub-module 211 receives the input from the base system stability sub-module 209 to determine the stability of the system. The stability of a project in a release is determined based on the logic/history of the 'n' previous releases to the current release. The Stability Value is determined as follows:

Stability Value=(Sum of Previous Releases+Current Release)/Number of releases history where the projects was present The overall baseline stability is determined and classified based on the 'Table B' where 'S' is equal to Stability Value Determined. A sample illustration for determining stability of the system is provided below:

| Project Release Stability | |
| --- | --- |
| Never Tested | 3 |
| Partial Project Tested | 2 |
| Full Project Tested | 1 |
| Not Available | 0 |

| Projects | Previous Release (R-3) | Previous Release (R-2) | Previous Release (R-1) | Current Release (R) | Stability Value |
| --- | --- | --- | --- | --- | --- |
| PRJ1 | 0 | 3 | 1 | 1 | 2.5 |
| PRJ2 | 3 | 1 | 3 | 1 | 4 |
| PRJ3 | 1 | 2 | 1 | 3 | 2.33 |

Figure 3:
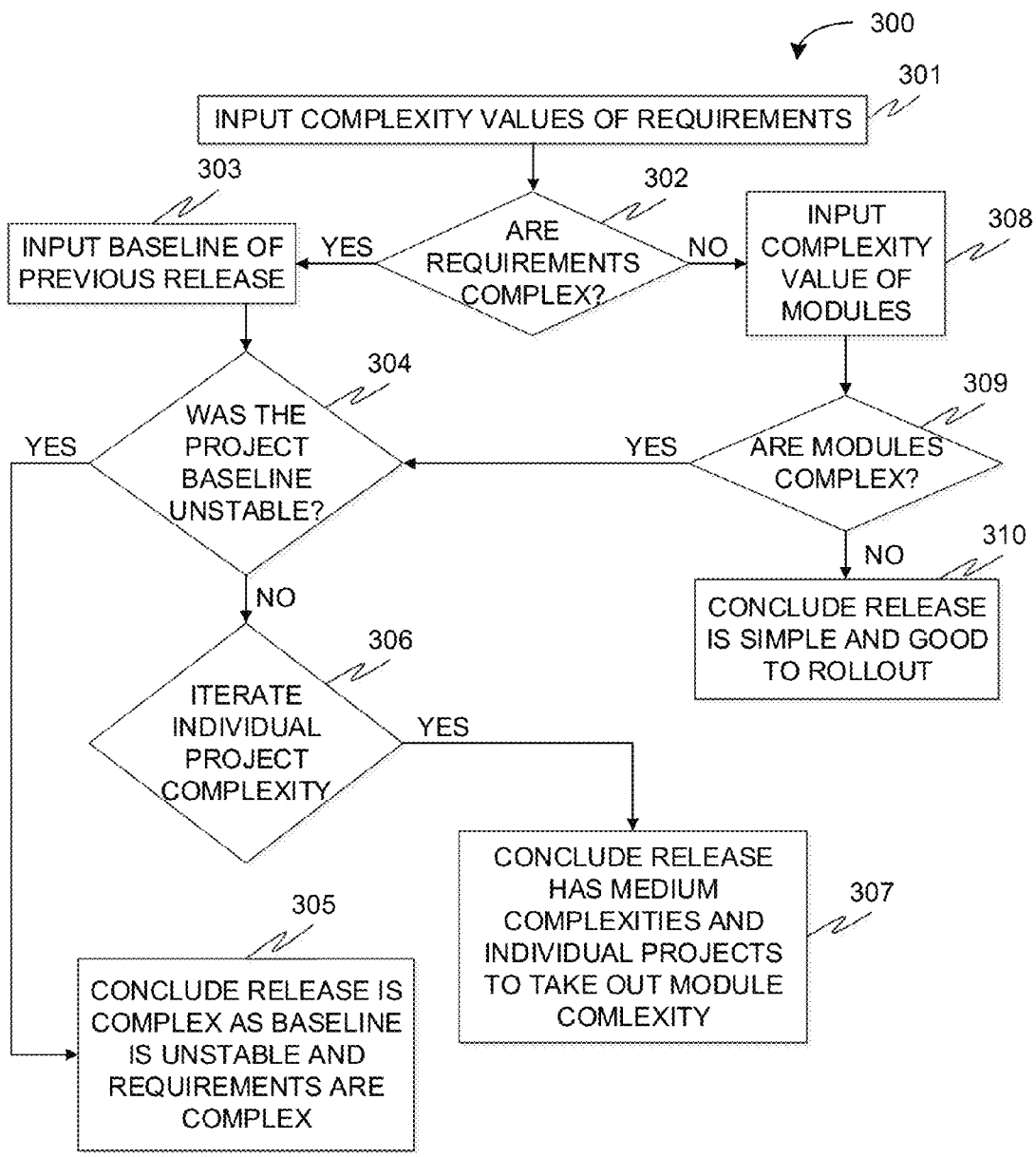
FIG. 3 is a flow diagram of an exemplary process for determining overall complexity of a release of a software product in accordance with some embodiments of the present disclosure.

The complexity quantifier sub-module 212 receives the data from the complexity analyzer sub-module 210 and stability analyzer sub-module 211 once the different complexities and the stability value of the system are determined. The overall complexity per project is subsequently determined based on requirement complexity, project complexity, module complexity and baseline stability. Referring now to FIG. 3, a control logic 300 for determining overall complexity of a release of a software product is depicted via a flowchart in accordance with some embodiments of the present disclosure. The complexity quantifier sub-module 212 receives complexity values of requirements at step 301 and analyzes the same at step 302. If the requirements are complex then the complexity quantifier sub-module 212 receives baseline of previous release at step 303. The complexity quantifier sub-module 212 analyzes input from the previous baseline releases to determine the overall complexity of the previous release at step 304. If the baseline is unstable and the new requirements are complex then it is concluded that the release is complex at step 305. The business stakeholders may be alerted to recheck the projects in the release to reduce the complexity. However, if the baseline is stable then the complexity quantifier sub-module 212 iteratively checks the complexity of each project at step 306. If a project is complex then the complexity of the project is concluded to the business and the release is reassessed again to see if the release is good to proceed at step 307. For example, in some embodiment, it may be concluded that the release has medium complexities and individual projects are to take out module complexity. In other words, the module complexities of individual modules are analyzed and if any module is found complex then the respective module is simplified so that the release or project can proceed.

If the requirements are not complex, then the complexity quantifier sub-module 212 receives complexity values of modules at step 308 and checks the complexity of each of the modules that are impacted because of the release at step 309. If the modules are not complex then it is concluded that the complexity of the release is minimum and the release of the software product and its associated projects are good to roll out and the expected risk of the release is minimum at step 310. However, if the modules are complex then the control logic 300 flows back to step 304 where the complexity quantifier sub-module 212 checks the stability of the release.

Alternatively, the complexity quantifier sub-module 212 determines the overall complexity per project as follows:

$A$ = Requirement Complexity × Baseline Stability $B$ = 1/(Module Complexity + Project Complexity)

Complexity per project = $A$-$B$

The overall complexity of the release is determined based on the sum of the complexity factor per project and the total number of projects. The overall complexity is determined and classified based on the 'Table C' where 'CF' is equal to the overall complexity factor. A sample illustration for determining the overall complexity of the release is provided below:

| Project | Project Complexity | Requirement Complexity | Module Complexity | Baseline Stability | Complexity Factor |
|---|---|---|---|---|---|
| PRJ1 | 1 | 1 | 1 | 1 | 0.50 |
| PRJ2 | 2 | 2 | 2 | 2 | 3.75 |
| PRJ3 | 3 | 3 | 3 | 3 | 8.83 |
| PRJ4 | 1 | 1 | 1 | 4 | 3.50 |
| PRJ5 | 2 | 2 | 2 | 1 | 1.75 |
| PRJ6 | 3 | 3 | 3 | 2 | 5.83 |
| PRJ7 | 3 | 3 | 3 | 3 | 8.83 |
| PRJ8 | 1 | 1 | 3 | 4 | 3.75 |
| PRJ9 | 1 | 3 | 3 | 1 | 2.75 |
| PRJ10 | 3 | 3 | 3 | 4 | 11.83 |
| PRJ11 | 1 | 1 | 3 | 3 | 2.75 |
| PRJ12 | 1 | 1 | 1 | 1 | 0.50 |
| PRJ13 | 2 | 2 | 2 | 2 | 3.75 |
| PRJ14 | 3 | 3 | 3 | 4 | 11.83 |
| PRJ15 | 3 | 1 | 1 | 1 | 0.75 |
| PRJ16 | 3 | 3 | 3 | 1 | 2.83 |
| PRJ17 | 1 | 1 | 1 | 4 | 3.50 |
| PRJ18 | 1 | 3 | 3 | 3 | 8.75 |
| PRJ19 | 2 | 2 | 3 | 3 | 5.80 |
| PRJ20 | 1 | 3 | 3 | 1 | 2.75 |
| PRJ21 | 1 | 1 | 3 | 1 | 0.75 |
| PRJ22 | 2 | 2 | 3 | 1 | 1.80 |

The overall complexity of the release determined by the complexity quantifier sub-module 212 is provided to the risk optimizer sub-module 213 which then determines the risk associated with release, prioritizes the levels of risk, and sends the risk information to the stake holders. The risk optimizer sub-module 213 prioritizes the levels of risk in any one of the levels: no risk or less risk (positive sign to stakeholders), medium risk (there is possibility of risks associated with the release), and high risk (there is possibility of failure and which needs stake holder's attention). The Overall Risk of the Release is determined as:

Overall Risk of the Release = Sum total of complexity factor per project/Total number of projects in the release The overall risk of the release is classified based on the 'Table D' where 'R' is equal to the overall risk of the release value. It should be noted that the overall risk is determined by the project Complexity and requirement Complexity. Even if the module is not complex and base line is stable the risk shall be considered high as the new changes introduced may introduce higher risk. The overall risk is deemed high or medium even if the new changes are risk free but the baseline is unstable. As noted above, the risks determined for the each projects in the release is then sent to the Output Module 204 where according to the configuration setting the details are send to stakeholders through email or shared platform (e.g., share point portal).

It should be noted that the complexity quantifier and risk optimization engine 200 may be implemented in programmable hardware devices such as programmable gate arrays, programmable array logic, programmable logic devices, and so forth. Alternatively, the complexity quantifier and risk optimization engine 200 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for determining and optimizing risk during software product release. For example, the exemplary system 100 and the associated complexity quantifier and risk optimization engine 200 may determine risk associated with a release of a software product by the processes discussed herein. In particular, as will be appreciated by those of ordinary skill in the art, control logic and/or automated routines for performing the techniques and steps described herein may be implemented by the system 100 and the associated complexity quantifier and risk optimization engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 4:
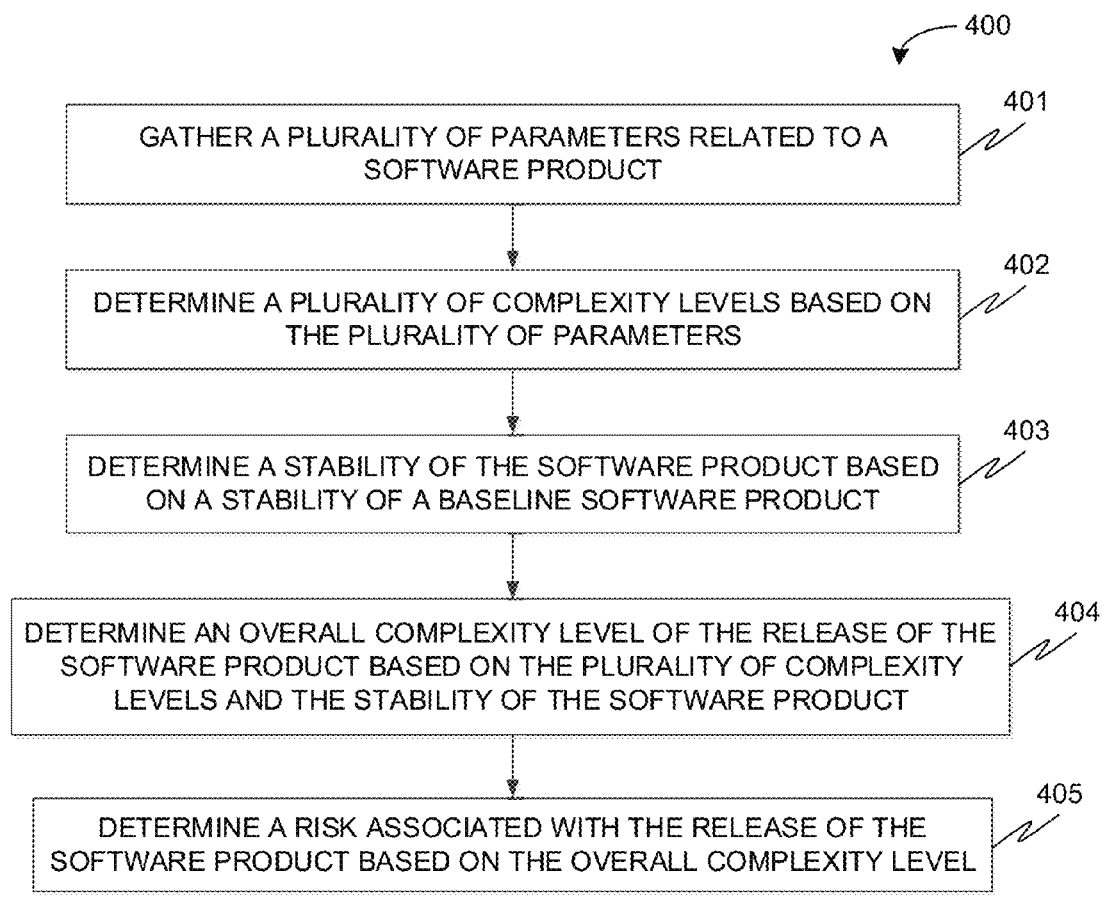
FIG. 4 is a flow diagram of an exemplary process for determining a risk associated with a release of a software product in accordance with some embodiments of the present disclosure.

For example, referring now to FIG. 4, exemplary control logic 400 for determining a risk associated with a release of a software product via a system, such as system 100, is depicted via a flowchart in accordance with some embodiments of the present disclosure. As illustrated in the flowchart, the control logic 400 includes the steps of gathering a plurality of parameters related to the software product at step 401, determining a plurality of complexity levels based on the plurality of parameters at step 402, determining a stability of the software product based on a stability of a baseline software product at step 403, determining an overall complexity level of the release of the software product based on the plurality of complexity levels and the stability of the software product at step 404, and determining the risk associated with the release of the software product based on the overall complexity level at step 405. The control logic 400 may further include the step of presenting the risk associated with the release to a user.

As noted above, the software product may include one or more projects and each of the one or more projects may include one or more modules. Further, the plurality of parameters includes a plurality of parameters for each project. The plurality of parameters for each project includes a requirement and a complexity value associated with the requirement. In some embodiments, the plurality of parameters for each project may also include at least one of a module, a complexity value associated with the module, a test case, a complexity value associated with the test case, a complexity value associated with the project, a defect, and so forth.

In some embodiments, gathering the plurality of parameters at step 401 further comprises gathering, for each project, the plurality of parameters required for determining the risk from at least one of a test management system, a software lifecycle management system, a requirement system, and a user. Additionally, gathering the plurality of parameters at step 401 may further comprise gathering a plurality of parameters related to the stability of the baseline software product. In some embodiments, determining the plurality of complexity level at step 402 further comprises determining, for each project, a complexity level for at least one of the plurality of parameters based on one or more complexities associated with the corresponding parameter. Additionally, in some embodiments, determining the stability at step 403 further comprises determining, for each project, a stability based on a logic of a plurality of previous releases to a current release. Moreover, in some embodiments, determining the overall complexity level at step 404 further comprises determining, for each project, an overall complexity by correlating the plurality of complexity levels and the stability of the software product. Further, in some embodiments, determining the risk at step 405 comprises determining the risk associated with the release based on the overall complexity and a total number of projects within the software product.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
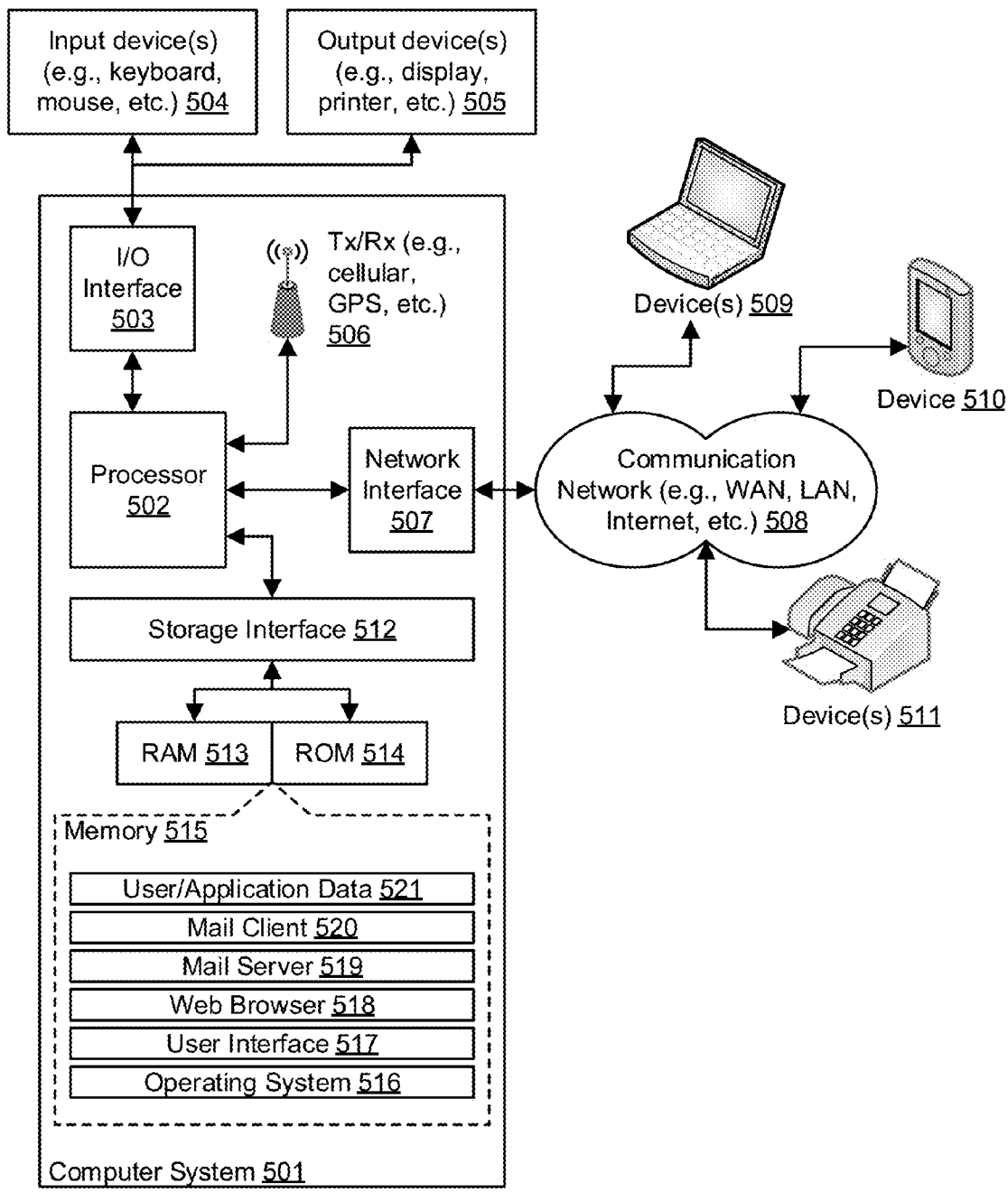
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 and complexity quantifier and risk optimization engine 200 for quantifying the complexity of systems and determining the risk during software production release. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 413, ROM 414, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., requirement complexities, module complexities, project complexities, stability measure, overall complexity factor, risk level, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above results in efficient and effective management of risk associated with release of a software product. The complexity determination and risk optimization techniques described in the embodiments discussed above provide a systematic way of identifying the complexity of critical requirements/ projects entering into a release, analyzing the stability of the product, determining the risk involved in each projects before entering into a release, and alerting the business/ release management to take precautionary measures. Additionally, the techniques described in the embodiments discussed above automate the process of risk optimization and therefore minimize person dependency. Further, the techniques described in the embodiments discussed above results in cost and effort savings as the software product roll-out failure is minimized and number of post release support tickets is reduced.

The specification has described system and method for synchronizing software application management platforms. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing software releases based on an optimized performance assessment of the software releases to facilitate failure mitigation improved software quality, the method implemented by one or more performance assessment computing devices and comprising:
   obtaining parameter data for a plurality of parameters for each of a plurality of projects associated with a current release of a software product;
   analyzing each of the projects and the parameter data to generate complexity data and stability data for each of the plurality of projects, wherein the complexity data comprises a plurality of different types of complexity values associated with each of the projects, and wherein the stability data comprises baseline stability values associated with each of the projects;
   analyzing the complexity data and the stability data to generate complexity factor values associated with each of the plurality of projects;
   generating an overall complexity factor data based on the complexity factor values associated with each of the plurality of projects;
   determining based on the generated overall complexity factor data one or more performance recommendations associated with the current release of the software product and
   generating and outputting to a requesting computing device one or more notifications comprising the one or more performance recommendations associated with the current release of the software product on the determination.

2. The method of claim 1, further comprising obtaining at least a portion of the parameter data from at least one of a test management system, a software lifecycle management system, a requirement system, or a user; and
   wherein the one or more notifications comprises email notifications and wherein the one or more performance recommendations comprises to recheck and reduce the complexity associated with the current release of the software product, a possibility of failure associated with the current release of the software product needs attention or the current release of the software product is good to roll out.

3. The method of claim 1, wherein the different types of complexity values comprise one or more of a project complexity values, a requirement complexity values, or a module complexity values.

4. The method of claim 1, further comprising generating one or more of the baseline stability values based on a stability of one or more previous releases of one or more of the projects.

5. The method of claim 1, further comprising generating the overall complexity factor values by correlating complexity level values for each of the different types of complexity values and the baseline stability values.

6. The method of claim 1, further comprising generating an overall risk value associated with the current release of the software product further based on a total number of the projects associated with the software product.

7. A performance assessment computing device, comprising memory comprising programmed instructions stored thereon and a processor coupled to the memory, which is configured to be capable of executing the stored programmed instructions to:
   obtain parameter data for a plurality of parameters for each of a plurality of projects associated with a current release of-a software product;
   analyze each of the projects and the parameter data to generate complexity data and stability data for each of the plurality of projects, wherein the complexity data comprises a plurality of different types of complexity values associated with each of the projects, and wherein the stability data comprises baseline stability values associated with each of the projects;
   analyze the complexity data and the stability data to generate complexity factor values associated with each of the plurality of projects; and
   generate an overall complexity factor data based on the complexity factor values associated with each of the plurality of projects;
   determine based on the generated overall complexity factor data one or more performance recommendations associated with the current release of the software product and
   generate and output to a requesting computing device one or more notifications comprising the one or more performance recommendations associated with the current release of the software product based on the determination.

8. The device of claim 7, wherein the processor is further configured to be capable of executing the stored programmed instructions to obtain at least a portion of the parameter data from at least one of a test management system, a software lifecycle management system, a requirement system, or a user; and
   wherein the one or more notifications comprises email notifications and wherein the one or more performance recommendations comprises to recheck and reduce the complexity associated with the current release of the software product, a possibility of failure associated with the current release of the software product needs attention or the current release of the software product is good to roll out.

9. The device of claim 7, wherein the processor is further configured to be capable of executing the stored programmed instructions to generate one or more of the baseline stability values based on a stability of one or more previous releases of one or more of the projects.

10. The device of claim 7, wherein the processor is further configured to be capable of executing the stored programmed instructions to generate the overall complexity factor values by correlating complexity level values for each of the different types of complexity values and the baseline stability values.

11. The device of claim 7, wherein the processor is further configured to be capable of executing the stored programmed instructions to generate an overall risk value associated with the current release of the software product further based on a total number of the projects associated with the software product.

12. The device of claim 7, wherein the different types of complexity values comprise one or more of a project complexity values, a requirement complexity values, or a module complexity values.

13. A non-transitory computer readable medium having stored thereon instructions for managing software releases based on an optimized performance assessment of the software releases to facilitate improved software quality comprising executable code which when executed by a processor, causes the processor to:

obtain parameter data for a plurality of parameters for each of a plurality of projects associated with a current release of-a software product;

analyze each of the projects and the parameter data to generate complexity data and stability data for each of the plurality of projects, wherein the complexity data comprises a plurality of different types of complexity values associated with each of the projects, and wherein the stability data comprises baseline stability values associated with each of the projects analyze the complexity data and the stability data to generate complexity factor values associated with each of the plurality of projects;

generate an overall complexity factor data based on the complexity factor values associated with each of the plurality of projects;

determine based on the generated overall complexity factor data one or more performance recommendations associated with the current release of the software product and generate and output to a requesting computing device one or more notifications comprising the one or more performance recommendations associated with the current release of the software product based on the determination.

14. The non-transitory computer readable medium of claim 13, wherein the executable code, when executed by the processor, further causes the processors to obtain at least a portion of the parameter data from at least one of a test management system, a software lifecycle management system, a requirement system, or a user; and wherein the one or more notifications comprises email notifications and wherein the one or more performance recommendations comprises to recheck and reduce the complexity associated with the current release of the software product, a possibility of failure associated with the current release of the software product needs attention or the current release of the software product is good to roll out.

15. The non-transitory computer readable medium of claim 13, wherein the different types of complexity values comprise one or more of a project complexity values, a requirement complexity values, or a module complexity values.

16. The non-transitory computer readable medium of claim 13, wherein the executable code, when executed by the processor, further causes the processors to generate one or more of the baseline stability values based on a stability of one or more previous releases of one or more of the projects.

17. The non-transitory computer readable medium of claim 13, wherein the executable code, when executed by the processor, further causes the processors to generate the overall complexity factor values by correlating complexity level values for each of the different types of complexity values and the baseline stability values.

18. The non-transitory computer readable medium of claim 13, wherein the executable code, when executed by the processor, further causes the processors to generate an overall risk value associated with the current release of the software product further based on a total number of the projects associated with the software product.

* * * * *